(12) United States Patent
Phillips et al.

(10) Patent No.: US 7,816,030 B2
(45) Date of Patent: *Oct. 19, 2010

(54) ELECTROLYTE COMPOSITION FOR NICKEL-ZINC BATTERIES

(75) Inventors: Jeffrey Phillips, La Jolla, CA (US); Samaresh Mohanta, San Diego, CA (US)

(73) Assignee: Powergenix Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/476,166

(22) Filed: Jun. 1, 2009

(65) Prior Publication Data

US 2009/0246623 A1 Oct. 1, 2009

Related U.S. Application Data

(63) Continuation of application No. 11/346,861, filed on Feb. 1, 2006, now Pat. No. 7,550,230, which is a continuation-in-part of application No. 10/980,124, filed on Nov. 1, 2004, now Pat. No. 7,033,700, which is a continuation of application No. 10/429,693, filed on May 6, 2003, now Pat. No. 6,811,926, which is a continuation of application No. PCT/CA01/01719, filed on Nov. 7, 2001, said application No. 11/346,861 application No. 10/980,439, filed on Nov. 2, 2004, now abandoned, is a continuation of application No. 10/429,712, filed on May 6, 2003, now Pat. No. 6,835,499, which is a continuation of application No. PCT/CA01/01715, filed on Nov. 7, 2001, said application No. 11/346,861 application No. 10/980,423, filed on Nov. 2, 2004, now abandoned, is a continuation of application No. 10/098,195, filed on Mar. 15, 2002, now Pat. No. 6,818,350.

(60) Provisional application No. 60/276,372, filed on Mar. 15, 2001.

(51) Int. Cl.
    *H01M 6/04* (2006.01)
(52) U.S. Cl. ........................ 429/206; 429/229; 429/231; 429/223; 429/207; 429/347
(58) Field of Classification Search ................. 429/206, 429/229, 231, 223, 207, 347
See application file for complete search history.

(56) References Cited

U.S. PATENT DOCUMENTS 3,287,164 A 11/1966 Arramce (Continued)

FOREIGN PATENT DOCUMENTS

CN 1434534 6/2003

(Continued)

OTHER PUBLICATIONS

Partial European Search Report, 07250401.2, dated Apr. 17, 2007.

(Continued)

*Primary Examiner*—Laura S Weiner
(74) *Attorney, Agent, or Firm*—Weaver Austin Villeneuve & Sampson LLP

(57) ABSTRACT

Electrodes and electrolytes for nickel-zinc secondary battery cells possess compositions that limit dendrite formation and other forms of material redistribution in the zinc electrode. In addition, the electrolytes may possess one or more of the following characteristics: good performance at low temperatures, long cycle life, low impedance and suitability for high rate applications.

16 Claims, 12 Drawing Sheets

U.S. PATENT DOCUMENTS

| | | | |
|---|---|---|---|
| 3,287,166 | A | 11/1966 | Arramce |
| 3,558,356 | A | 1/1971 | Jost |
| 3,870,564 | A | 3/1975 | Takumura et al. |
| 3,951,687 | A | 4/1976 | Takamura et al. |
| 4,017,665 | A | 4/1977 | Sandera et al. |
| 4,037,033 | A | 7/1977 | Takamura et al. |
| 4,273,841 | A | 6/1981 | Carlson |
| 4,304,828 | A | 12/1981 | Vaidyanathan |
| 5,215,836 | A | 6/1993 | Eisenberg |
| 5,721,072 | A | 2/1998 | Motoani et al. |
| 6,723,469 | B1 | 4/2004 | Watanabe et al. |
| 6,787,265 | B2 | 9/2004 | Phillips |
| 6,790,559 | B2 | 9/2004 | Phillips |
| 6,797,433 | B2 | 9/2004 | Phillips |
| 6,801,017 | B2 | 10/2004 | Phillips |
| 6,811,926 | B2 | 11/2004 | Phillips |
| 6,818,350 | B2 | 11/2004 | Phillips |
| 6,835,499 | B2 | 12/2004 | Phillips |
| 7,008,723 | B2 | 3/2006 | Daniel-Ivad et al. |
| 7,033,700 | B2 | 4/2006 | Phillips |
| 7,550,230 | B2 | 6/2009 | Phillips et al. |
| 2002/0182501 | A1 | 12/2002 | Phillips |
| 2004/0175613 | A1 | 9/2004 | Eylem et al. |
| 2005/0003270 | A1 | 1/2005 | Phillips |
| 2005/0064292 | A1 | 3/2005 | Phillips |
| 2005/0112464 | A1 | 5/2005 | Phillips |
| 2005/0112465 | A1 | 5/2005 | Phillips |
| 2006/0240317 | A1 | 10/2006 | Phillips |

FOREIGN PATENT DOCUMENTS

| | | | |
|---|---|---|---|
| CN | | 2632866 | 8/2004 |
| EP | | 0833397 | 4/1976 |
| EP | | 0457354 | 11/1991 |
| EP | | 0697746 | 2/1996 |
| EP | | 0755087 A1 | 1/1997 |
| JP | | 56-029345 | 3/1981 |
| JP | | 58-163171 | 9/1983 |
| JP | | 59-186255 | 10/1984 |
| JP | | 60-056368 | 1/1985 |
| JP | | 61210192 A | 9/1986 |
| JP | | 62-035453 | 2/1987 |
| JP | | 7296813 | 11/1995 |
| JP | | 60167264 | 3/2005 |
| WO | | WO 93/26056 | 12/1993 |

OTHER PUBLICATIONS

Extended European Search Report, 07250401.2 dated Jul. 25, 2007.
Journal of Power Sources, "Sealed Ni-Zn Cells, 1996-1998"; J. Jindra, Elsevier, Amsterdam, NL., vol. 88, No. 2, Jun. 2000, pp. 202-205.
European Office Action dated Apr. 4, 2008 issued in EP Application No. 07250401.2.
PowerGenix Systems, Inc. "PSI-A Supplier of battery, super capacitor and power systems solutions" from website www.powergenix.com, Aug. 10, 2002.
PowerGenix Systems, Inc. "Next Generation Rechargeable Batteries" Aug. 4, 2003.
Binder et al., "Corrosion Studies of Zinc Electrode Current Collector," Electromechanical Society Proceedings, vol. 95-14, pp. 48-56, 1996.
CN Office Action dated Jan. 29, 2010 in related CN application.

ELECTROLYTE COMPOSITION FOR NICKEL-ZINC BATTERIES

CROSS-REFERENCE TO RELATED APPLICATIONS

This application is a continuation of and claims benefit of priority under 35 U.S.C. 120 of U.S. patent application Ser. No. 11/346,861, filed Feb. 1, 2006 which is now U.S. Pat. No. 7,550,230, entitled "ELECTROLYTE COMPOSITION FOR NICKEL-ZINC BATTERIES", which is in turn a continuation in part of each of the following applications: U.S. patent application Ser. No. 10/980,124, filed Nov. 1, 2004 which is now U.S. Pat. No. 7,033,700, entitled "FORMULATION OF ZINC NEGATIVE ELECTRODE FOR RECHARGEABLE CELLS HAVING AN ALKALINE ELECTROLYTE," which is in turn a continuation of Ser. No. 10/429,693 (Now U.S. Pat. No. 6,811,926) filed May 6, 2003, which is in turn a continuation of PCT/CA01/01719 filed Nov. 7, 2001; U.S. patent application Ser. No. 10/980,439, filed Nov. 2, 2004 which is now abandoned, entitled "NEGATIVE ELECTRODE FORMULATION FOR A LOW TOXICITY ELECTRODE HAVING ADDITIVES WITH REDOX POTENTIALS POSITIVE TO ZINC POTENTIAL," which in turn is a continuation of U.S. patent application Ser. No. 10/429,712 (Now U.S. Pat. No. 6,835,499) filed May 6, 2003, which is in turn is also a continuation of PCT/CA01/01715 filed Nov. 7, 2001; U.S. patent application Ser. No. 10/980,423, filed Nov. 2, 2004 which is now abandoned, entitled "ALKALINE CELLS HAVING LOW TOXICITY RECHARGEABLE ZINC ELECTRODES," which is in turn a continuation of U.S. patent application Ser. No. 10/098,195 (Now U.S. Pat. No. 6,818,350) filed Mar. 15, 2002, which in turn claims priority to U.S. Provisional Patent Application No. 60/276,372, filed Mar. 15, 2001. Each of these applications is incorporated herein by reference for all purposes.

Each of these applications is incorporated herein by reference for all purposes.

BACKGROUND

1. Field of the Invention

The present invention relates to the rechargeable batteries and more particularly to electrolyte and electrode compositions for nickel-zinc rechargeable batteries.

2. Description of the Related Art

The advent of portable communication and computation devices that allow diverse mobile connectivity has fueled growth and innovation in the rechargeable battery field. Increased capacity and power has made possible the entry of rechargeable power sources in various fields including the power tool arena. Because power tools typically have large current demands, rechargeable power sources have necessarily evolved to accommodate rapid discharge characteristics. It can be appreciated that the present invention, as described later in this document, will also find use in power tool applications as well as various other applications including Uninterruptible Power Supplies (UPS), electric vehicles, and high demand consumer electronics—all of which require high carrying capacity and current discharging ability. Of course, the invention also applies to relatively lower discharge rate applications such as many mainstream consumer electronics applications.

Because of the hazardous nature of some of the commonly used materials for conventional rechargeable power sources, it would be desirable to replace these conventional power sources with a safer and more environmentally benign power source that reduces or eliminates the quantity of hazardous materials. In particular, it would be desirable to find a substitute for the widely used nickel cadmium (NiCd) battery cell.

Rechargeable nickel-zinc (NiZn) cells provide a power-to-weight ratio comparable to and even exceeding nickel cadmium cells at a reasonable cost. However, nickel-zinc battery technology has not been widely deployed in part because it has been found to have a relatively limited cycle life. In other words, a given nickel-zinc cell can fully charge and discharge for only a fraction of the cycles typically attained with a comparable nickel cadmium cell. As is known to researchers in the field, this is due, at least in part, to zinc redistribution and dendrite formation. The problem is most pronounced in nickel-zinc cells used in power tools and other devices requiring rapid discharge. Various advances in electrolyte composition have reduced these issues to an extent, but cycle life remains an important consideration. There is a need therefore for electrolytes that provide long cycle life in nickel-zinc cells. There is a further need for electrolytes that are capable of providing high discharge rate and good performance at low temperatures.

SUMMARY

The present invention provides improved nickel-zinc cells having electrolytes suitable for high rate and other demanding applications. Aspects of the invention pertain to cells having phosphate buffer electrolyte. Such cells may be characterized by the following features: (a) a negative electrode comprising zinc or a zinc compound; (b) a positive electrode comprising nickel oxide, hydroxide, and/or oxyhydroxide; and (c) an electrolyte comprising: (i) between about 0.025 and 0.25 M phosphate (and possibly even higher concentrations additional phosphate can remain in solution); (ii) between about 0.01 and 1 M fluoride; and (iii) between about 4 and 9 M free alkalinity. In certain embodiments, the electrolyte contains not more than about 1M borate (e.g., not more than about 0.1M borate). The electrolyte compositions recited herein may exist at various stages during fabrication and use of the cell; e.g., prior to formation of the cell.

In certain embodiments, the phosphate concentration is between about 0.05 and 0.15 M (e.g., between about 0.07 and 0.11M). In some cases, particularly those applications requiring low temperatures (e.g., reaching 0° C. or lower), long cycle life (e.g., at least about 250 cycles), and/or relatively low rates of discharge, the electrolyte comprises between about 4 and 6M free alkalinity. In other cases, the electrolyte comprises between about 6 and 9M free alkalinity. The free alkalinity in the electrolyte may be provided as one or more hydroxides such as sodium, lithium, and/or potassium.

In addition to the hydroxides and phosphates listed above, the electrolyte may include a compound that can minimize zinc corrosion. Examples include polyethylene glycol, tetrabutylammonium hydroxide, and an alkyl phosphate ester. In certain embodiments, the electrolyte includes an indium compound such as indium sulfate. The indium compound may be present in the electrolyte in a concentration of between about 0.0003 and 0.01M.

In some cases, it may be desirable that the nickel-zinc battery cell has a relatively small quantity of electrolyte in comparison to the amount of electrode material. Such cell may operate in a "starved" format and have a relatively high concentration of free alkalinity. To maintain high concentrations of hydroxide in the electrolyte after extended cycling, the electrodes (positive and/or negative) may be fabricated with little if any easily oxidizable organic compound.

These and other features and advantages of the invention will be described in more detail below with reference to any associated drawings.

BRIEF DESCRIPTION OF THE DRAWINGS

FIG. 8b is a cross-sectional view of the battery cell shown in FIG. 8a.

DETAILED DESCRIPTION OF THE PREFERRED EMBODIMENTS

Figure 1A:
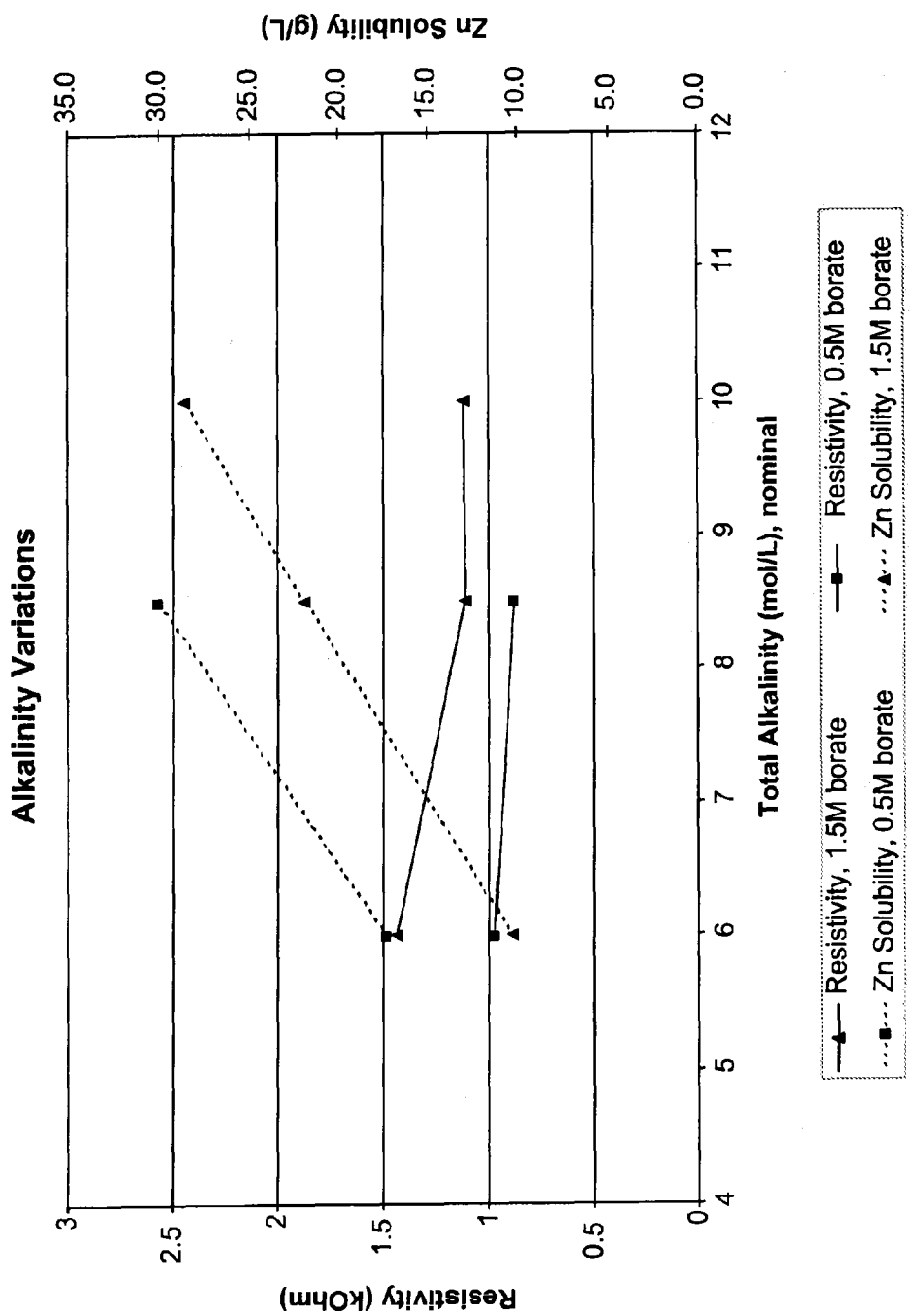
FIG. 1A is a graph showing how zinc solubility changes in response to varying alkalinity in an electrolyte.

The present invention provides electrodes and electrolytes for use in nickel-zinc secondary battery cells. In certain embodiments, the electrolyte possesses a composition that limits dendrite formation and other forms of material redistribution in the zinc electrode. In addition, in certain embodiments, the electrolytes of the present invention possess one or more of the following characteristics: good performance at low temperatures, long cycle life, low impedance, high power density, and suitability for high rate applications.

Electrolyte Composition

Electrolytes that perform particularly well in limiting dendrite formation and other forms of material redistribution in the zinc electrode are described in Eisenberg's U.S. Pat. No. 5,235,836, issued Jun. 1, 1993, which is hereby incorporated by reference. The Eisenberg patent describes alkaline galvanic cells having an electrolyte composition including (1) an alkali or alkaline earth hydroxide present in an amount to produce a stoichiometric excess of hydroxide to acid in the range of 2.5 to 11.0 equivalents per liter, (2) a soluble alkali or earth alkali fluoride in an amount corresponding to a concentration range of 0.01 to 1.0 equivalents per liter of total solution, (3) a borate, arsenate, and/or phosphate salt (e.g., potassium borate, potassium metaborate, sodium borate, and/or sodium metaborate). Specific compositions having these bounds are described as examples in the Eisenberg patent.

According to various embodiments, the electrolytes of the present invention provide at least the benefits of the electrolytes disclosed in the Eisenberg patent, while providing improved performance; in particular one or more the following performance characteristics of the battery: high rate discharge, low impedance, high power density, long cycle life, low material redistribution, and good performance at low-temperatures.

Further, in certain embodiments, the nickel-zinc cells of this invention employ a starved electrolyte format. Such cells have relatively low quantities electrolyte in relation to the amount of active electrode material. They can be easily distinguished from flooded cells, which have free liquid electrolyte in interior regions of the cell. A starved cell may be employed to produce a relatively lightweight cell that facilitates recombination of hydrogen and oxygen produced during cycling. Further details of certain starved cell formats are described elsewhere herein.

It should be understood that the composition of a cell's electrolyte typically varies over the life of the cell. Unless otherwise specified herein, the electrolyte compositions of this invention are applicable to any stage of a cell's life, from introduction of the electrolyte to the cell during fabrication, to formation of the cell, to cycling during normal usage. Further, during normal operation, the electrolyte composition may change over the course of a cell cycle from a fully charged cell state to a fully discharged cell state. Generally, the electrolyte compositions described herein are not associated with any particular state of charge or other cell condition. Unless otherwise indicated, the compositions described herein may be present in a cell at any time over the course of a cell cycle.

Phosphate Buffer with Low Borate

A high alkalinity phosphate buffered electrolyte is one class of electrolyte that was found to have significantly improved power density and low temperature capacity over multiple cycles in comparison to related buffered alkaline electrolyte formulations for nickel-zinc cells. In certain embodiments, the electrolyte employs primarily phosphate as a buffering agent, with little or no borate or other buffering agent. The electrolytes also have a relatively high concentration of free alkalinity, typically primarily in the form of hydroxide ion. In certain embodiments, the free alkalinity is provided at a level of at least about 4M, in other embodiments at least about 6M, and in still other embodiments at least about 7M. In certain embodiments, the free alkalinity is provided at a level of between about 4 and 6M. In other embodiments, the free alkalinity is provided at a level of between about 6 and 9M.

It is surprising that phosphate buffered electrolytes provide improved performance. Because phosphate buffers at pH 12 while borate buffers at pH 13.7, phosphate buffered electrolytes would be expected to experience wider pH swings during operation. However, it has also been found that zinc phosphate is relatively insoluble, and therefore the likelihood of zinc redistribution may be reduced.

Other components such as fluorides may be included in the phosphate buffered electrolyte to improve performance. Further, to reduce the solubility of zinc, anions such as silicate may be added. To reduce the corrosion of zinc, particularly in electrolytes having a high concentration of free alkalinity, certain corrosion inhibiting components may be added. An example of such component is tetrabutylammonium hydroxide. Another example is indium sulfate. Such components will be described in more detail below.

As indicated, the phosphate buffered electrolytes described here generally have a relatively high level of free alkalinity. The free alkalinity of an electrolyte includes all alkalinity remaining in the electrolyte after the basic components of the electrolyte have neutralized any acidic components. For example, an electrolyte produced by combining 8 moles of potassium hydroxide and 4 moles of dibasic sodium borate ($Na_2HBO_3$) to produce one liter of a borate buffered electrolyte would have 4M free alkalinity, assuming no other acid or basic species were added to the electrolyte.

Free alkalinity is typically represented as available hydroxide ions in solution. However, over time and at certain stages in the charge/discharge cycle, some of the hydroxide in the free alkalinity may become unavailable due reaction with carbon dioxide to form carbonates, combination with soluble zinc oxide to form zincate anion, etc. In some cells, carbonate may represent a significant percentage of the free alkalinity; e.g., up to about 20% in some cases.

Electrolytes having high levels of free alkalinity may be particularly valuable in nickel-zinc cells employing a starved format. Because such cells do not have a reservoir of available electrolyte, the small amount of available electrolyte may profit from relatively high quantities of hydroxide.

Specific Example of a Phosphate Buffered Electrolyte

In one embodiment, a phosphate buffer of this invention includes the following components.

1. Total and Free alkalinity—7 Molar alkalinity, primarily as hydroxide (in certain cell designs, this may include a certain amount of carbonate—e.g., about 0.7 after formation). To provide such high alkalinity, it may be desirable to provide the phosphate as a salt (e.g., a fully basic sodium salt) so that most or all of the total hydroxide present in the initial hydroxide solution remains as free hydroxide. The alkalinity may be provided from one or more hydroxides such as lithium hydroxide, sodium hydroxide, and potassium hydroxide. In a specific example, lithium hydroxide is provided at about 0-4M, sodium hydroxide is provided at about 1.5 to 3.5M, and potassium hydroxide is provided at about 4-7M. The relative amounts of these hydroxides may follow the percentages indicated by these ranges.

2. Buffer

A. Phosphate—In certain embodiments, approximately 0.05 to 0.15 molar phosphate is employed in the electrolyte; e.g., about 0.1 molar phosphate. In some cases, relatively higher concentrations of phosphate (e.g., about 0.25 molar phosphate) may not remain soluble, particularly at low temperatures. Phosphate may be provided in many different forms such as phosphoric acid, monobasic salt (e.g., $NaH_2PO_4$), dibasic salt, or tribasic salt. As indicated, in certain embodiments where very high levels of free alkalinity are to be maintained, a tribasic salt is employed.

B. Small amounts of other buffering components may be employed (e.g., borate, carbonate, and/or arsenate), but such components should be present only in relatively low concentrations. In certain embodiments, no borate is present. In certain embodiments, no buffer of any type other than phosphate is present.

3. Fluoride—The concentration of fluoride may be between about 0.01 and 1 molar for example. In certain embodiments, the concentration is between 0.2 and 1 molar, or between about 0.2 and 0.4 molar. The fluoride may be provided as any one or more of various fluoride salts such as alkali or alkaline earth metal fluorides. Other examples include fluorides of titanium, aluminum, silver, gallium, indium, tin, tellurium, lead bismuth, d-block transition metals, f-block lanthanides, and combinations thereof.

4. Indium salts—In certain embodiments, indium is present in a concentration of between about 0.0003 and 0.01 molar. The indium may be provided as a salt such as indium sulfate, indium acetate, and/or indium fluoride. As indicated above, it is believed that indium salts may reduce the corrosion of zinc in highly alkaline electrolytes. This additive is optional in certain embodiments. In some cases, special techniques may be required to provide relatively high concentrations of indium (e.g., about 0.001M or greater) in the alkaline electrolyte solution. In some embodiments, an anodic dissolution process employing metallic indium as an anode may provide the required concentration of indium in solution.

5. Tetrabutylammonium hydroxide—This additive is optional in certain embodiments. As indicated, this compound may reduce zinc corrosion in the electrolyte. In certain embodiments, TBAH is provided at a concentration of between about 0.001 and 0.02M (e.g., about 0.005M or about 0.01M). In another embodiment, the concentration of TBAH is between about 0.001 and 0.002M.

Certain variants on the above composition may be considered. For example, in certain embodiments, some carbonate may be added in concentrations of between about 0.1 and 1M. Highly soluble carbonates such as sodium or potassium carbonate may be used for this purpose. In addition, certain additives may be used in place of or in addition to tetrabutylammonium hydroxide to reduce zinc corrosion. Examples of such additives include polyethylene glycol or an alkyl phosphate ester such as RA 600 (available from Rohm and Haas Co.). Still further, one or more additives may be provided to reduce the solubility of zinc in the electrolyte. Such additives include, for example, silicate, gallate, formaldehyde-sulfoxylate, oxalate, oleate, stearate, sulfide, carbonate, and combinations thereof. These may be provided as soluble salts such as those of sodium or potassium.

Electrolyte Composition Analysis

Various tests of electrolyte performance were undertaken to validate inventive concepts disclosed herein. This section describes one initial methodology employed for validating certain electrolyte formulations of the invention based on basic parameters such as solubility, conductance, and AC impendence.

In a first electrolyte variations experiments, the three independent variables were taken to be alkalinity (total), borate concentration, and phosphate concentration. Three major dependent variables were measured to evaluate the performance of the cells: conductance (measured as resistance), zinc solubility, and AC impedance of built cells (only some groups). The range of variations was from 0-1.5M borate, 4-10 molar total alkalinity and either 0 (75 ppm) or 0.1M phosphate.

A 4×4×3 factorial (4 levels of alkalinity, 4 levels of Borate and 3 levels of phosphate) was considered and 15 electrolyte formulations were initially prepared. With the measurements of various parameters, 4 electrolyte variations were considered for cell manufacture. After this initial analysis, extensive testing was conducted to further define those electrolyte compositions of this invention that are best for particular conditions and applications.

Figure 1B:
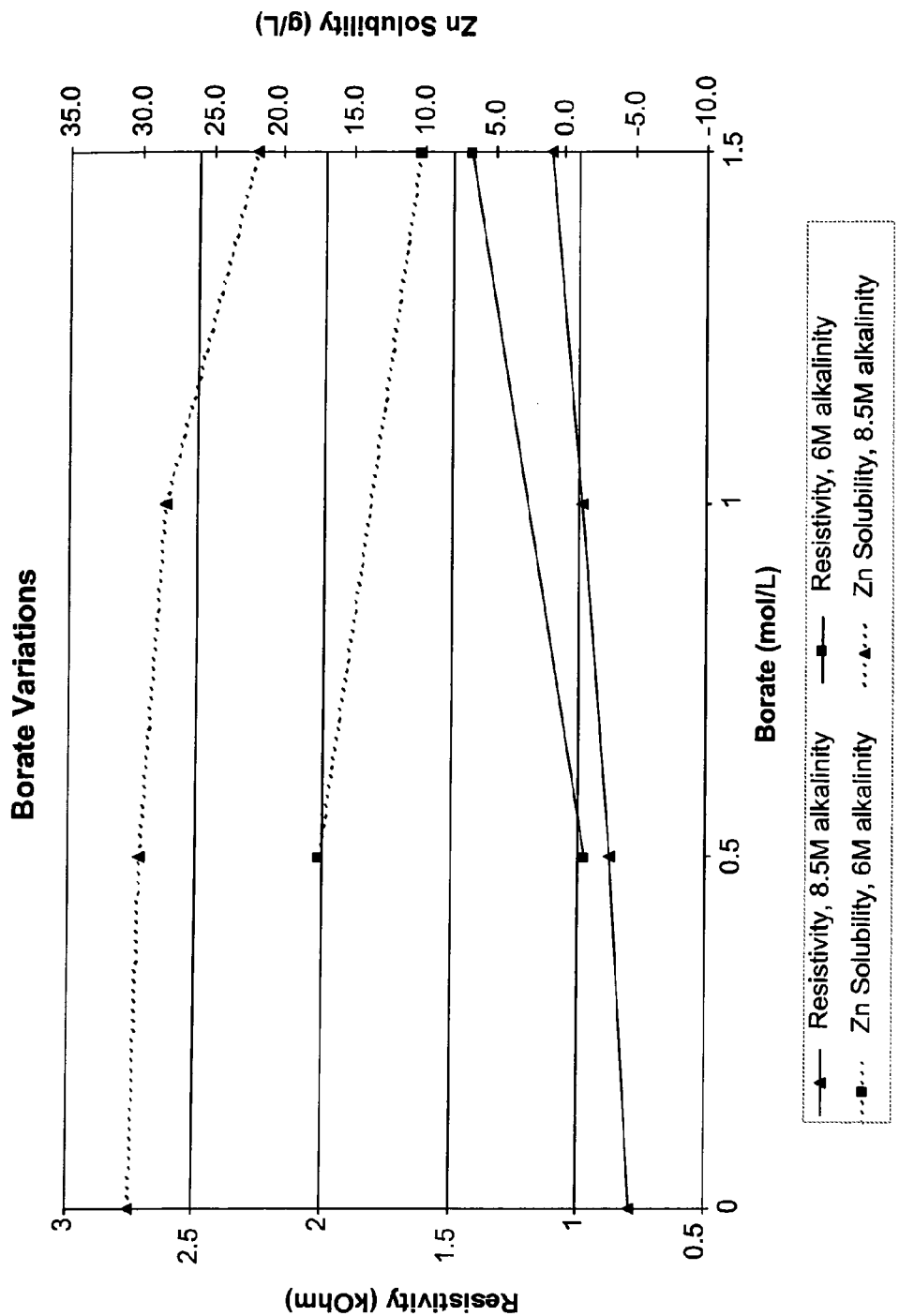
FIG. 1B is a graph showing how zinc solubility changes in response to varying borate concentration in an electrolyte.

Zn Solubility:

It was found that zinc solubility generally decreases with decreasing alkalinity and increasing borate concentration, while being less affected by presence of phosphate. Zinc solubility is roughly linear with respect to alkalinity (three points were considered for varying hydroxide at 1.5M borate). See FIG. 1A. With respect to borate variation, zinc solubility was found to be relatively flat at low borate concentrations (0-1M), while starting to drop much more steeply after 1M borate (see the curve at 8.5M total OH). See FIG. 1B.

Electrolyte Conductance:

Conductance was measured indirectly by measuring the resistance of electrolyte in a thin plastic tube via an apparatus consisting of two electrolyte reservoirs connected by the plastic tubing. In the small sample described here resistance was found to increase with increasing borate concentration (at least in the range of 0-1.5M), and decrease with increasing alkalinity. Increasing phosphate from 0 to 0.1M also seems to increase the resistance somewhat. Note that for alkalinity, the increase in resistance was found to be somewhat curved—flattening out somewhat at alkalinities higher than about 9M, while for borate the relation was somewhat linear in the range studied.

Figure 2A:
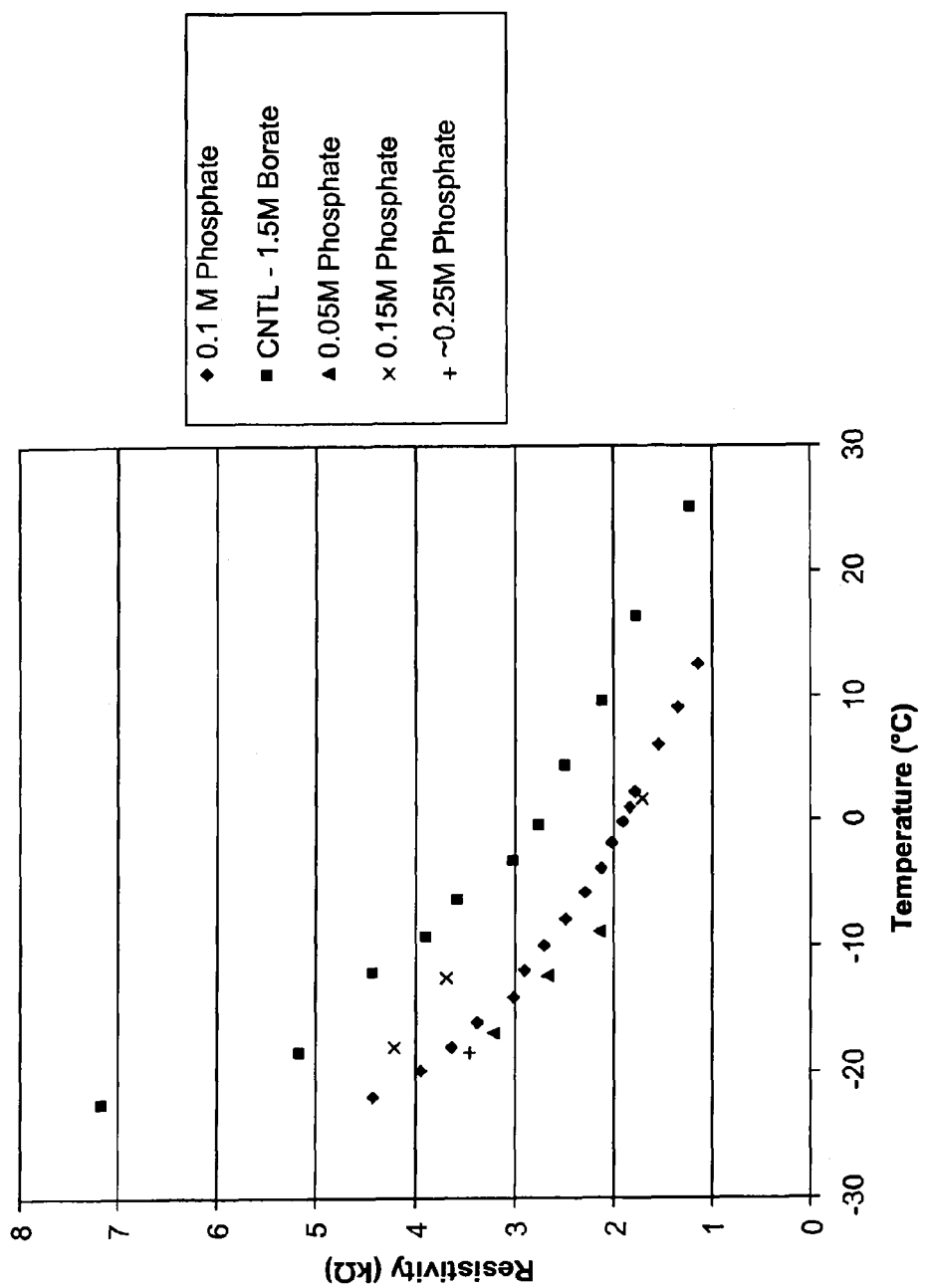
FIG. 2A is a graph showing low-temperature resistivity of phosphate and borate-containing electrolytes.
Figure 2B:
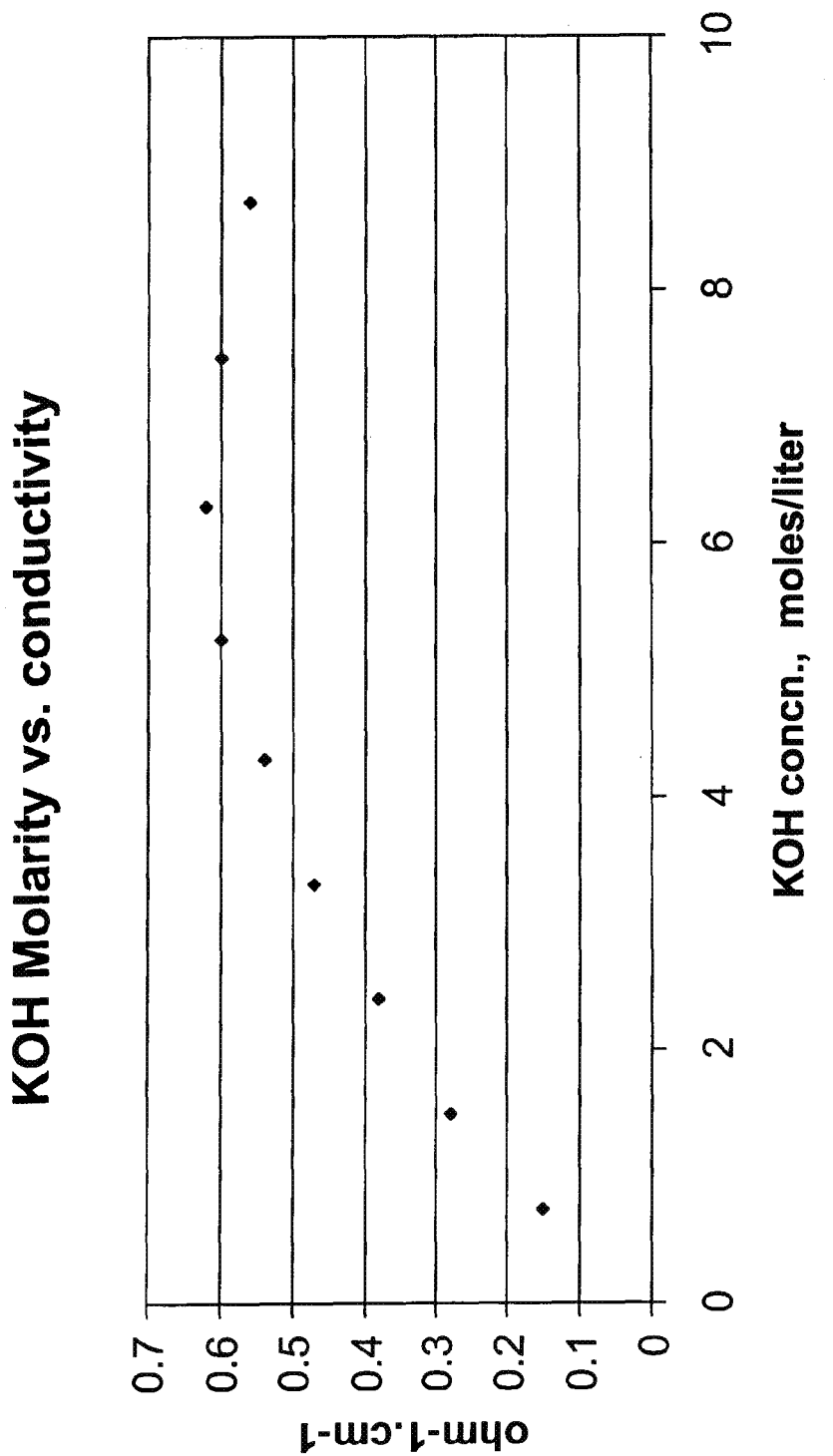
FIG. 2B is a graph showing conductivity versus free KOH concentration in KOH solutions.

Note that the low-temperature resistivity of phosphate-containing electrolyte has been found to be lower than that of the borate-containing electrolyte as shown in FIG. 2A. At room temperature, the conductivity of potassium hydroxide solutions has been found to reach a maximum at a concentration of slightly over 6M. FIG. 2B is a graph showing the relationship between conductivity and concentration of free KOH (in aqueous solution without other additives).

AC Impedance:

Cycling performance was found to roughly track the impedance, with the electrolyte of lowest impedance, also showing the best cycling performance.

Examples Employing Phosphate Buffer Electrolyte

Figure 3:
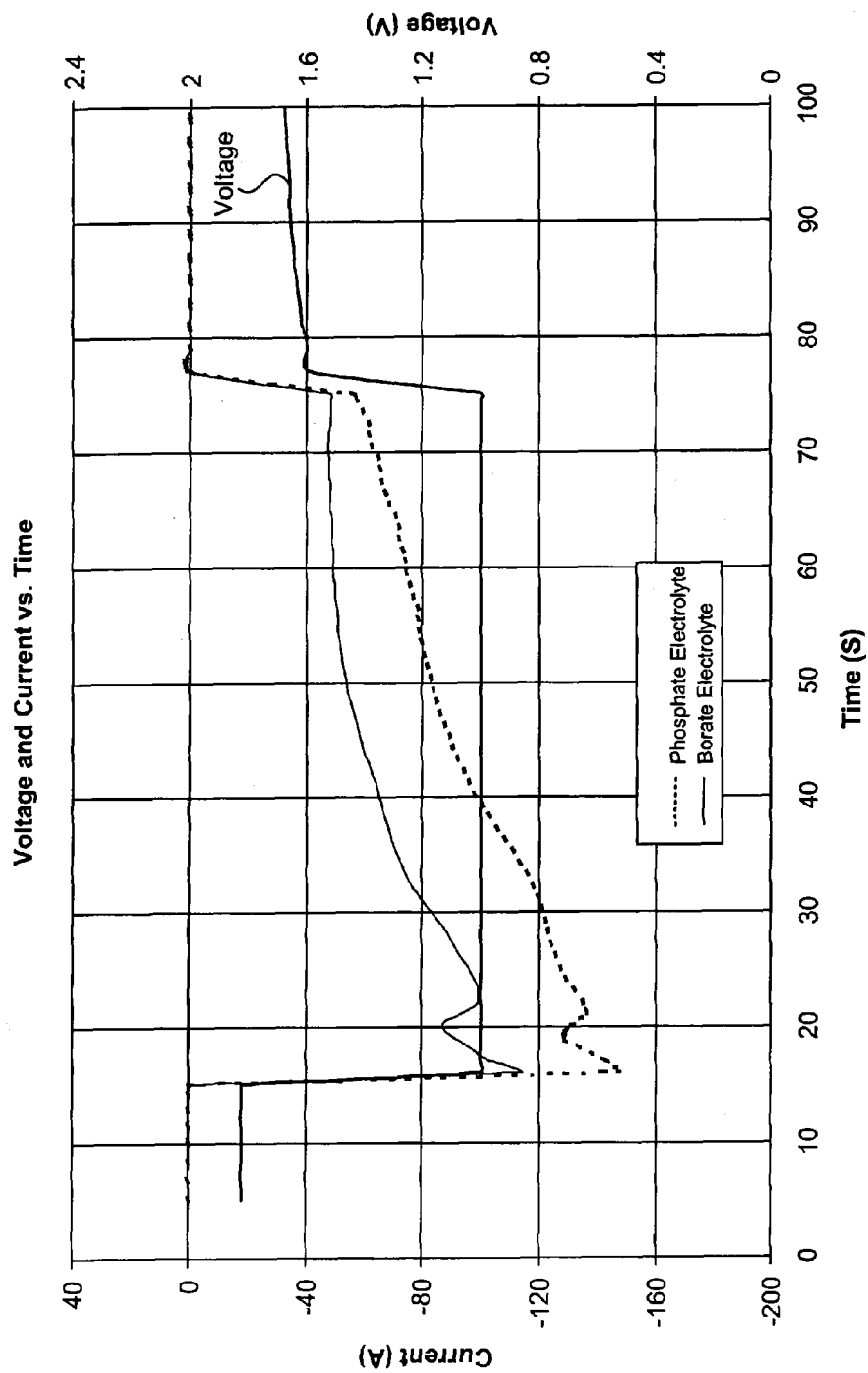
FIG. 3 is a graph showing results of a 1 volt constant voltage discharge for a phosphate buffer electrolyte and a borate buffer electrolyte in sub-C sized nickel-zinc cells at room temperature.

Temperature Increase and Amperage—FIG. 3 is a graph showing results of a 1 volt constant voltage discharge for a phosphate buffer electrolyte and a borate buffer electrolyte in sub-C sized nickel-zinc cells at room temperature. These were constructed as jellyroll cells having a capacity of approximately 2 Amp-hours, an impedance of approximately 4 milli-ohms, an open circuit voltage of approximately 1.74 volts, and a loaded voltage of approximately 1.6 volts. The borate buffered cell had an electrolyte composition as follows:

Borate—1.5 M (provided as boric acid, which was neutralized by hydroxide)
Total alkalinity—8.5M (provided as sodium (2.24M), potassium (5.9M), and lithium hydroxides (0.35M))
Free alkalinity—Approximately 4M (some of the total alkalinity is consumed neutralizing the boric acid). Of the 4M free alkalinity approximately 0.8M is converted to carbonate after formation.
Fluoride—approximately 0.28M (provided as potassium fluoride)

The phosphate buffered cell had an electrolyte composition as follows:

Phosphate—Approximately 0.1M (provided as tribasic sodium phosphate)
Total and Free alkalinity—8 Molar alkalinity, primarily as hydroxide (this may be reduced by 10% as a result of adventitious carbonate). The hydroxide was provided as sodium hydroxide (0.84M), potassium hydroxide (6.73M), and lithium hydroxide (0.4M).
Fluoride—approximately 0.28M (provided as potassium fluoride)
Indium Sulfate—500 ppm
Tetrabutylammonium hydroxide—0.005M In this 1 volt constant current discharge experiment, multiple cells were tested, each of the same construction, but with different electrolyte and/or zinc oxide composition in the negative electrode. FIG. 3 shows results for two representative cells, one with the borate electrolyte and one with the phosphate electrolyte. Specifically, the figure shows applied voltage and current (Amperes) as a function of time.

In this experiment, in one minute, the discharge current of the phosphate buffer cell went from 150 Amps to 60 Amps at room temperature. But for a duration of 20 seconds (an appropriate duration for power tool applications), the average current was about 125 A. For a one volt discharge in a cell weighing about 48 grams this represents an average power density of approximately 2500 W/kg over 20 seconds, which is significantly higher than what one would observe with many other systems including borate buffered cells. It is also noteworthy that the temperature of the phosphate buffer cell reached only 70° C. after 1 minute. Under high rate discharge conditions external temperatures of a sub-C cell should not exceed 85° C. if there is to be no danger of internal damage to temperature sensitive components such as the separator.

Figure 4:
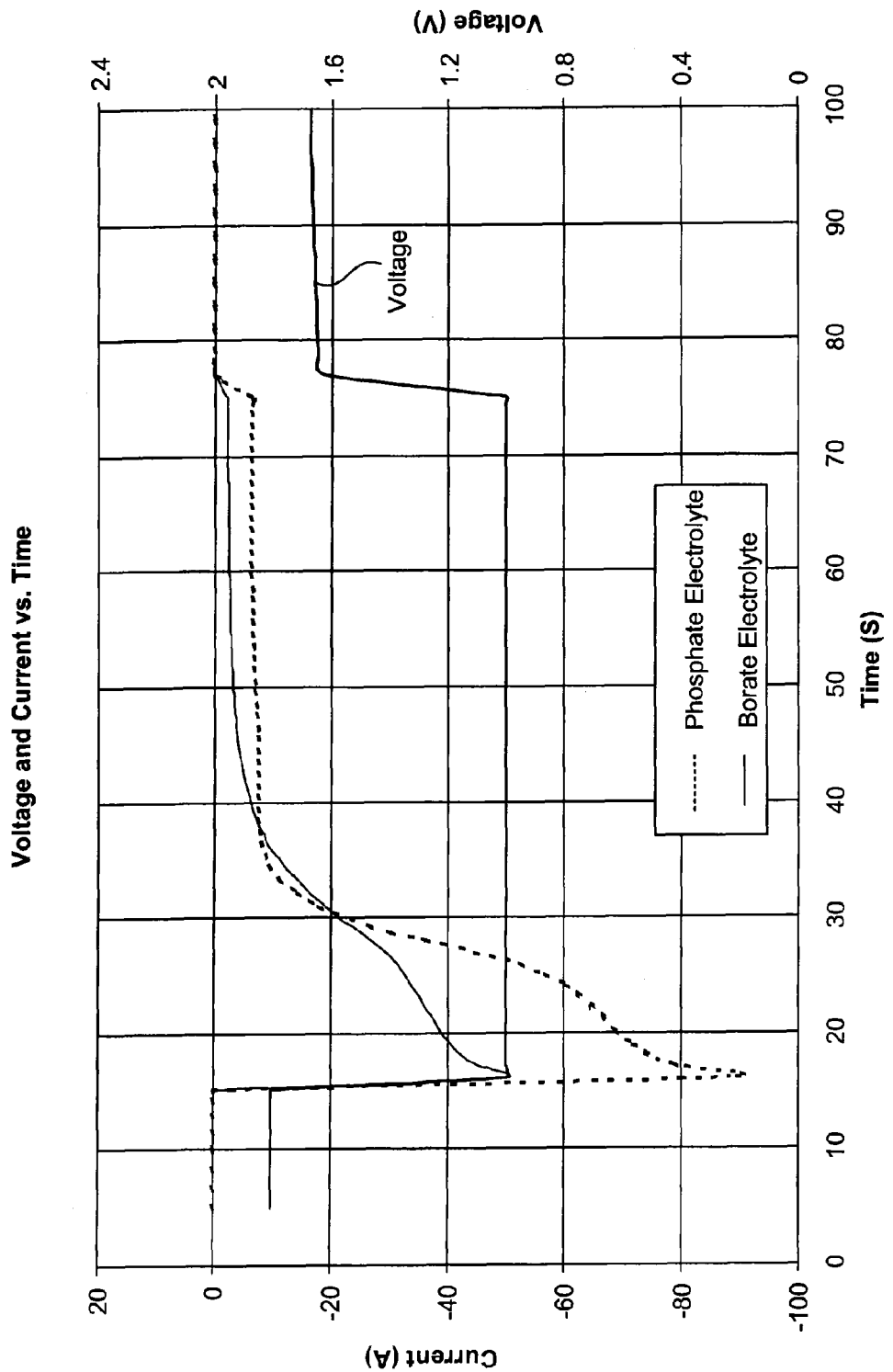
FIG. 4 is a graph showing results of a 1 volt constant voltage discharge for a phosphate buffer electrolyte and a borate buffer electrolyte in sub-C sized nickel-zinc cells at −26° C.

FIG. 4 shows results for a similar experiment conducted at $-26°$ C. The two cells shown in this plot were sub-C cells having borate and phosphate buffered electrolyte of the compositions set forth above for FIG. 3. As can be seen, even at this very low temperature the phosphate buffered electrolyte significantly outperformed the borate buffered electrolyte.

Figure 5A:
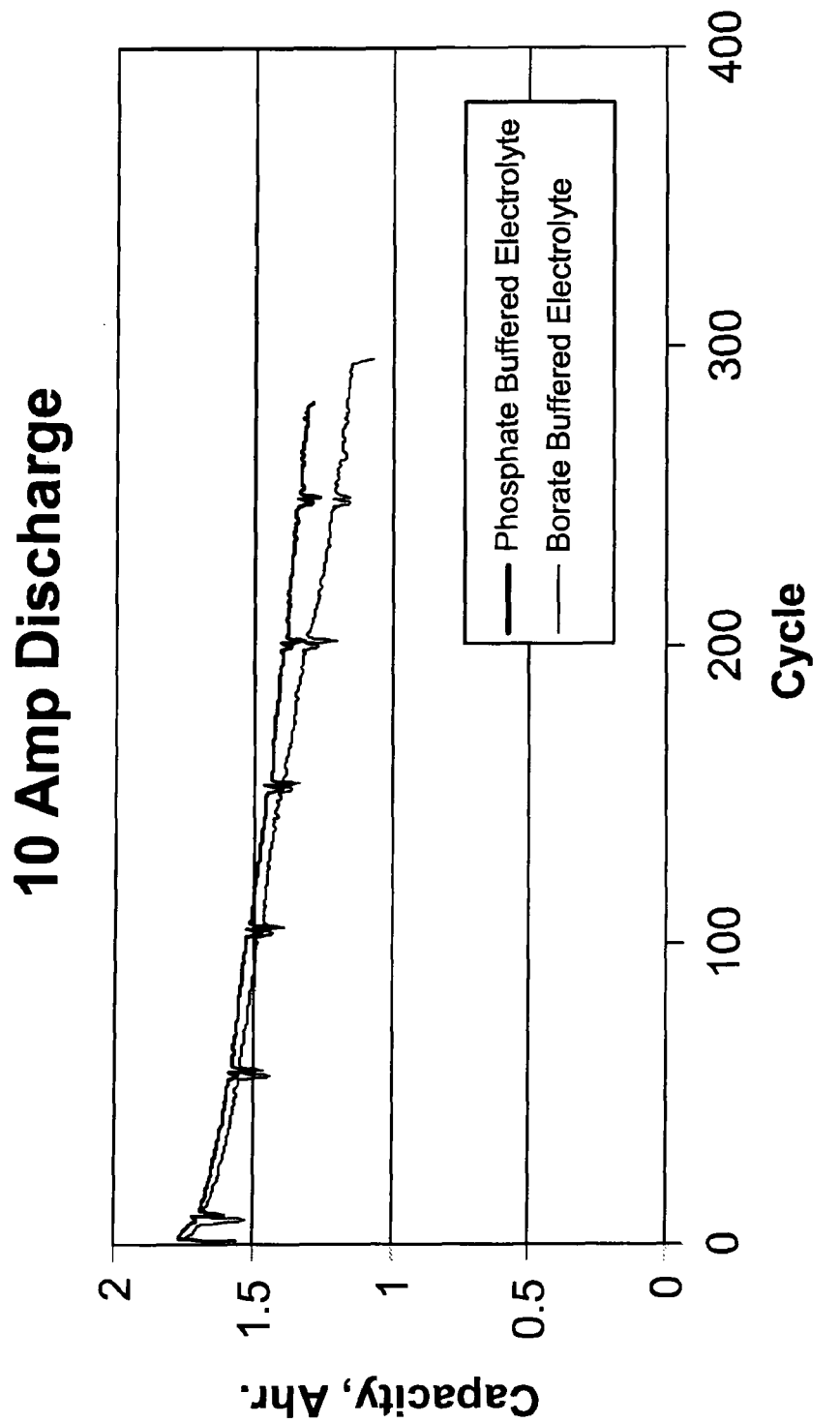
FIG. 5A shows comparative cycle life and capacity results for phosphate and borate electrolyte cells when cycled at 10 Amp constant current discharge coupled to periodic 20 Amp constant current discharges every $50^{th}$ cycle.

Cycle Life—FIG. 5A shows results for a cycle life study in which cells were discharged at 10 Amps constant current, cycle-by-cycle, and on every $50^{th}$ cycle they discharged at 20 Amp constant current (and then waiting 24 hours before resuming cycling). From the data presented in FIG. 5A, it can be seen that the tested phosphate buffer cell has reached 200 cycles at significantly higher capacity than the borate buffer cell. The capacity separation is even greater as the 300 cycle mark is approached.

Figure 5B:
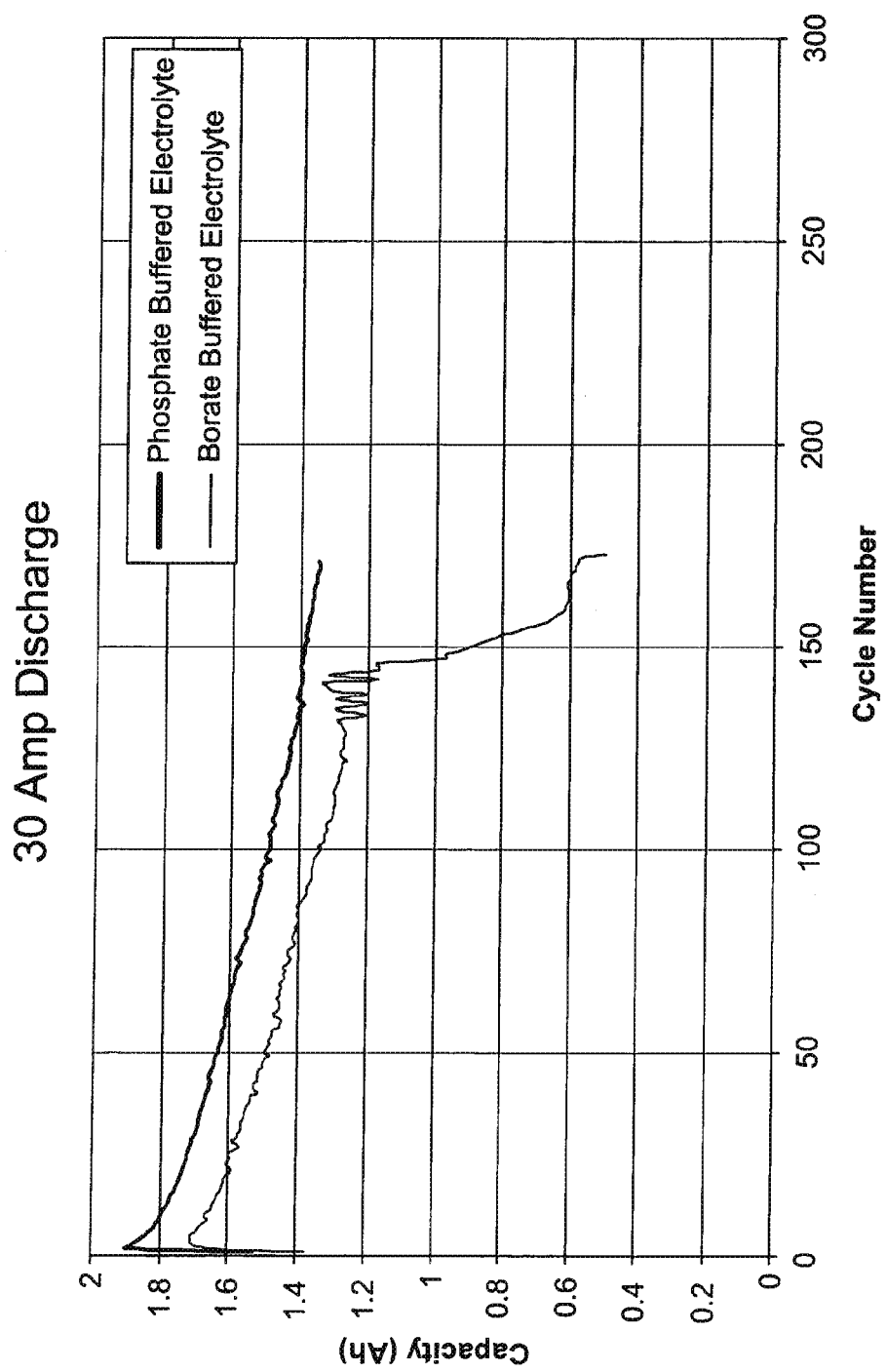
FIG. 5B shows comparative cycle life and capacity results for phosphate and borate electrolyte cells when cycled at 30 Amps constant current discharge.

At higher discharge rates, the phosphate buffered cells out performed the borate buffered cells even more clearly with respect to cycle life. FIG. 5B (30 Amp discharges) illustrates this. As can be seen, at this higher amperage discharge rate, the borate electrolyte fails earlier than the phosphate electrolyte and has a lower capacity.

Figure 6A:
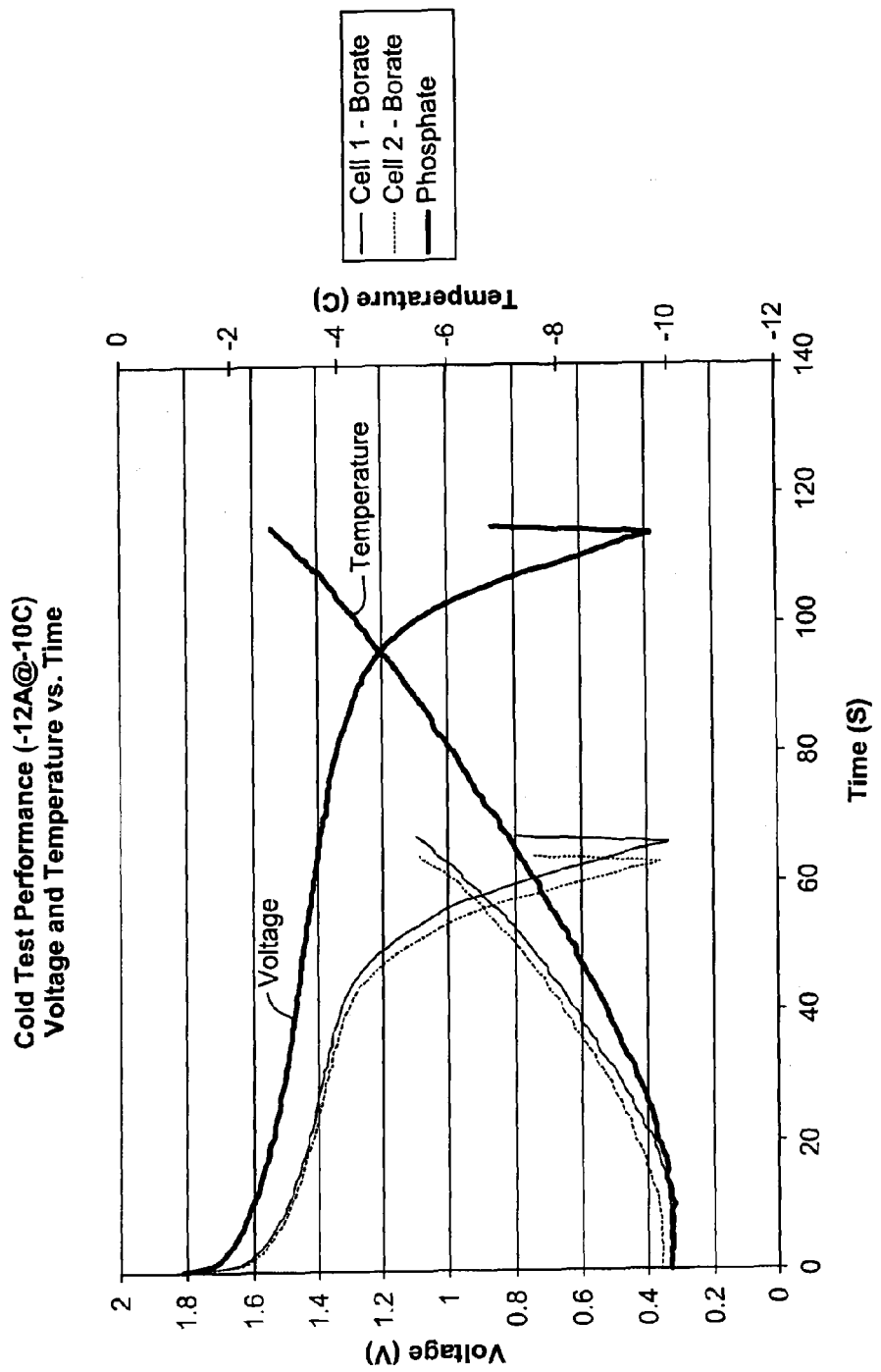
FIG. 6A shows low temperature capacity of borate and phosphate buffered cells at −10° C.
Figure 6B:
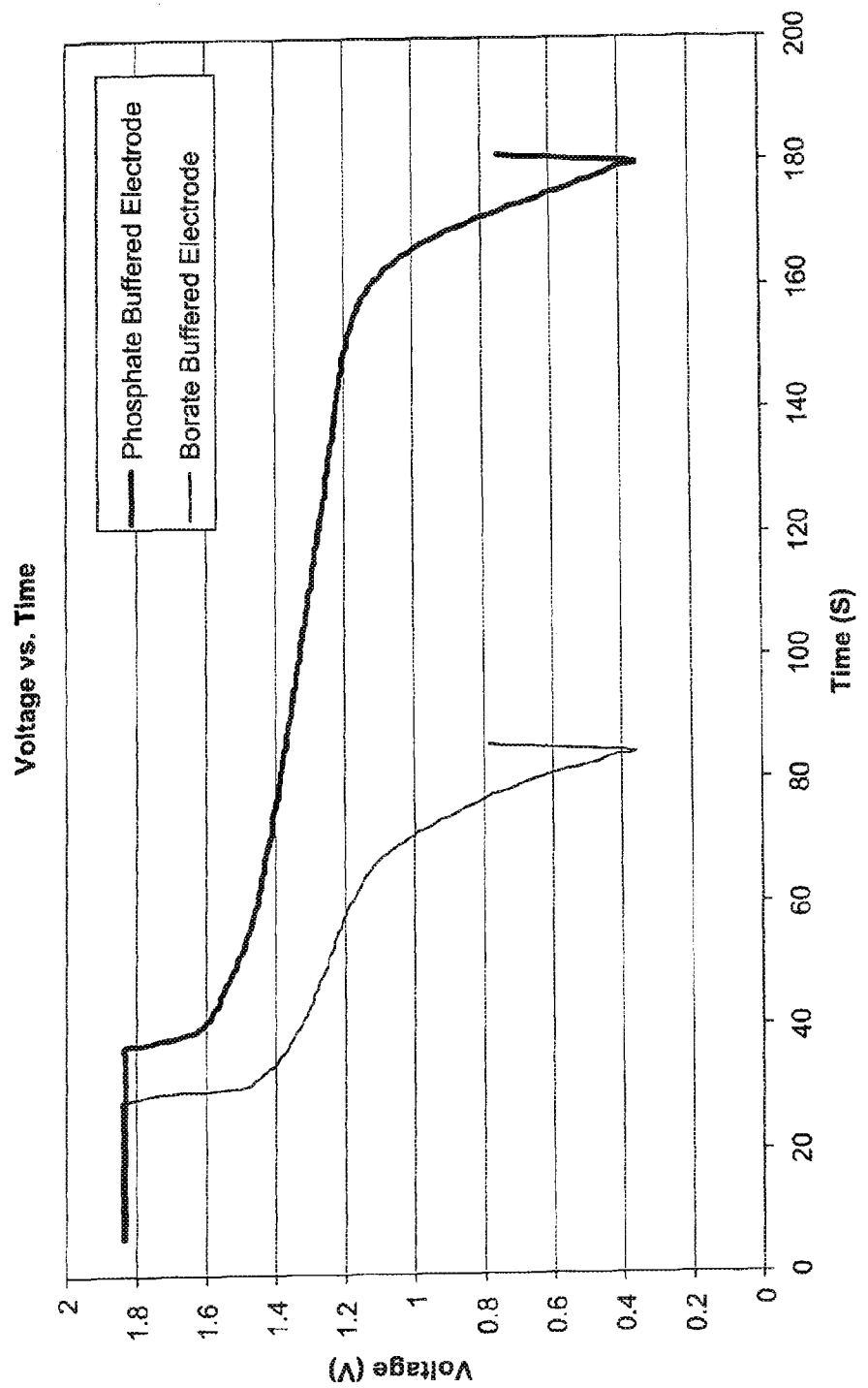
FIG. 6B shows low temperature capacity of borate and phosphate buffered cells at −18° C.

Low temperature testing—At a low temperature (about $-10°$ C.), sub-C test cells are discharged at a constant current of 12 Amps until fully discharged, reaching approximately 0.3 volts. Based on the number of coulombs passed, one can determine cell capacity. The results as depicted in FIG. 6A show that phosphate buffered cells (alkaline electrolyte with 0.1M phosphate as described above) have a low temperature capacity of about 0.38 Amp-hours. For comparison, typical borate buffer cells as described above (1.5M borate) were found to have a low temperature capacity of only about 0.22 Amp-hours. In summary, cells employing the phosphate electrolyte delivered approximately 0.38 Ah at $-10°$ C. when discharged at 12 A (curves shown in FIG. 6A). The borate electrolyte delivered only 0.22 Ah under the same conditions. The increase in cell temperature during discharge is also shown in FIG. 6A. Comparable results for a discharge at $-18°$ C. were observed as shown in FIG. 6B.

Impedance—Cells made with the high alkalinity, phosphate buffer electrolyte have about 10-20% lower impedance than cells employing the lower alkalinity borate buffered electrolyte when tested at room temperature. At lower temperatures, particularly below $-20$ C this impedance difference will be greater owing to the increased viscosity of the borate electrolyte. In solution, the phosphate electrolyte was found to be 20% more conductive than the borate electrolyte.

Impedances of sub-C cells measured at 1 kHz after formation are shown in the table below.

TABLE 1

| Electrolyte | Cell Impedance (milli Ohm) |
| --- | --- |
| 1.5M Borate & 4M free alkalinity electrolyte | 4.6 |
| 0.1M Phosphate & 7M free alkalinity | 3.76 |
| 0.1M Phosphate & 6M free alkalinity | 3.95 |
| 0.1M Phosphate & 5M free alkalinity | 4.39 |

Cobalt Redistribution—Cobalt is often provided as an additive to the positive nickel electrode. It improves the electrode conductivity and provides other benefits. However, it is important that cobalt remains with the positive electrode and does not redistribute throughout the cell. If cobalt reaches the zinc negative electrode, it may effectively catalyze hydrogen gas generation by lowering the overpotential for hydrogen evolution. Redistribution of cobalt from the positive electrode to the negative electrode during cell formation and cycling is a significant problem. It has been found that use of phosphate buffered electrolytes significantly reduces the amount of cobalt migrating from the positive nickel electrode to the negative zinc electrode in comparison to use of more conventional borate buffered electrolytes. For example, in an experiment using a sub-C nickel-zinc cell employing an electrolyte comprising 0.1M phosphate and 7M free alkalinity, the zinc electrode contained only 53.4 ppm cobalt after formation. In a comparable experiment, employing the same positive electrode (with the same amount of cobalt initially present) but employing a borate electrolyte (1.5M borate with approximately 4M free alkalinity), the zinc electrode contained 153.2 ppm cobalt in the zinc electrode of one cell and 155.3 ppm cobalt in the zinc electrode of another cell after formation. It is believed that the phosphate electrolyte reduces the solubility of cobalt compounds and therefore reduces the propensity for cobalt to move from the positive electrode to the negative electrode during formation as well as normal cycling.

Performance Criteria

It will be worthwhile to briefly discuss certain battery cell performance criteria in terms of specific, non-limiting examples. Most of the criteria described herein are well understood to those of skill in the art and the ranges defining desirable and optimal performance are known. Nevertheless, in order to provide additional context, these criteria will be exemplified here.

High Rate Discharge

In some embodiments, the electrolyte compositions of this invention provide performance advantages when used in high-rate (discharge) applications such as battery cells in power tools. The ability to repeatedly discharge at high rates—over the full course of discharge—is an intrinsically desirable feature. Cells said to have "high discharge" rates may discharge at rates of at least about 0.01 Amperes per $cm^2$ of zinc electrode surface area (e.g., average discharge rates of about 0.01 to 0.4 Amperes/$cm^2$). These should be contrasted with cells employed in "low rate" applications, which typically require discharging at an average rate of about 0.001 to 0.01 Amperes/$cm^2$. Examples of low rate discharge applications include some consumer electronics applications and load leveling for power companies. In a specific example, a 1.5 Amp-hour nickel-zinc cell discharges at a rate of at least about 10 Amps, e.g., between about 10 and 60 Amps.

Other measures of discharge rate are commonly used. For example, the "C" value of a battery cell represents a discharge rate at which the rated capacity of the cell is fully discharged in one hour. Obviously, this measure depends on the rated capacity of the cell. For sub-C cell format nickel-zinc batteries having a rated capacity of 2 Ah, a high rate application might discharge the cell at 20 A or 10 C.

It should be understood that a given discharge of a cell may employ multiple high rate events, some of greater magnitude than others. Batteries may be designed for maximum discharge rate; e.g., about 20 Amps for a sub-C cell that might correspond to operation of a circular saw. However, such battery might then be placed in a drill or reciprocating saw, which discharges at a lower rate; e.g., about 10 Amps and then placed in a circular saw and discharged at 20 Amps. All this may take place over the course of a single discharge cycle from a fully charged to a fully discharged state. Thus, it should be understood that when high discharge rates and applications are described herein this does not necessarily imply that a high discharge rate be maintained over the full course of discharge. Further, for some applications, it may be appropriate that the cell be able to maintain a high rate discharge for only a short periods or pulses during a discharge and then allowed to recover before the next high rate discharge event.

A parameter related to discharge rate is power density. Power in a cell is measured as the product of voltage and current. Power density is a cell's power output per unit weight. Jellyroll type nickel-zinc cells employing certain high alkalinity electrolytes described herein have been found to achieve an average power density of at least about 2500 Watts/Kg over 20 seconds of high rate discharge.

Various cell design features affect power density and the ability to discharge at high rates. For example, low internal impedance facilitates discharging cells at high rates. A significant fraction of a cell's impedance arises in the electrolyte and electrodes. Thus electrolytes having high ionic conductivity are desirable. Maintaining free hydroxide level at or near an optimum conductivity range in the electrolyte may be important for high rate discharge applications. Reduction in free hydroxide affects conductivity and cell capacity, and can therefore negatively impact the ability to discharge at a high rate. Maintaining a desirable free hydroxide level in the electrolyte, as discussed further herein, may be particularly difficult when a cell is discharging or charging at a high rate because at the higher temperatures associated with high rate processes, the organic materials in the electrodes are more susceptible to oxidation, which produces carbon dioxide. The carbon dioxide can react with free hydroxide to produce carbonate, effectively removing the free hydroxide from the electrolyte.

Long Cycle Life

A battery cell's cycle life is the number of charge/discharge cycles available from the cell performing under specified conditions. Cycle life is typically measured by determining how many cycles a cell maintain a particular discharge capacity under specified discharge conditions. Generally speaking, cells with long cycle lives are desirable because they need not be replaced as often as cells having shorter cycle lives. According to various embodiments, nickel-zinc cells employing electrolytes of this invention may have a cycle life of at least about 200 cycles. In further embodiments, the cells have a cycle life of at least about 500 cycles. A cycle is often defined for a particular application. Certain criteria such as depth of discharge (in terms of, e.g., coulombs passed or cell voltage), discharge rate, charging rate and conditions, etc. can define a cycle. Obviously, high rate discharge conditions, deep discharges, fast charging regimes, etc. can negatively impact cycle life. As indicated above, cells employing high alkalinity electrolytes of this invention can maintain long cycle lives even when subjected to high rate discharge rates.

Unless otherwise noted here, a cell cycle involves discharging the cell to a depth of 100% of the rated capacity (about 1.8-1.9 A-hours for a sub-C cell) and at a rate of 12 A (for a sub-C cell). The recharge for power tool applications is typically achieved in under about 1.5 hours. Obviously, the rated capacity of a cell depends on the cells size and construction.

A significant factor in improving cycle life involves reducing shape change and dendrite formation that occurs when zinc dissolved in the electrolyte during discharge does not re-plate uniformly during charge. While the occurrence zinc electrode shape change and its attendant problems has been understood for decades, the underlying mechanisms are still subject to debate. It is undisputed however that the compositions of the electrolyte and electrodes have a significant impact.

It has also been observed that cycle life is impacted by cell impedance, which is impacted by free hydroxide level in the electrolyte. For example, it is now known that once the free hydroxide in the electrolyte moves outside an optimum range, cell capacity and cycle life can drop precipitously.

Low-Temperature Performance

According to various embodiments, cells employing the electrolytes described herein perform remarkably well at low-temperature. Low temperature performance is important for a number of applications where batteries are to be used in winter and/or in far northerly or southerly latitudes. It is not uncommon for power tools, for example, to be used at temperatures at or below 0° C.

In some embodiments, nickel-zinc cells having "good" low temperature performance maintain at least about 65% of their room temperature capacity at 0° C. In other embodiments, cells maintain at least about 65% of their room temperature capacity at −20° C.

Certain electrolytes of this invention may be particularly suitable for high rate discharge at low temperatures. In some embodiments, the cells are capable of discharges of at least about 0.08 Amperes per $cm^2$ of zinc electrode surface area at 0° C., and more preferably at −20° C.

As described below, it has been found that certain high-alkalinity phosphate buffered electrolytes have particularly good performance at low temperatures. Such electrolytes and their low temperature performance are described elsewhere herein.

Low Impedance

The capacity and power a cell can deliver is determined in part by the cell's impedance. In certain embodiments, "low impedance" sub-C cells have an overall AC impedance (measured at 1 kHz) of below about 5 milliohms, more preferably below about 4.5 milliohms, and most preferably below about 4 milliohms.

In nickel-zinc cells, the electrolyte and separator typically contribute a little more than about 50% of the overall impedance of the cell. Impedance due to the electrolyte depends on the conductivity of the electrolyte, which in turn depends on the amount of free hydroxide in the electrolyte. Although an electrolyte's conductivity depends on features in addition to the concentration of potassium hydroxide, it is interesting to see that FIG. 2B shows that there is an optimum amount of free hydroxide to obtain maximum conductivity in a simple solution. As with other performance criteria maintaining hydroxide level is important for low impedance.

Other factors that have a significant effect on the impedance of the cell include the method of current collection and the choice of current collection materials. Current collection discs that contact the full electrode edge on either end of a jelly roll play a significant role in reducing the cell impedance by facilitating uniform current, density. The choice of heavier gauge metal current collectors and highly conductive materials such as copper can also minimize the overall cell impedance.

Design Factors Aiding Performance

According to various embodiments, the electrolyte compositions and cells of the present invention may provide improved performance by (a) maintaining the free hydroxide level within an optimum range over a prolonged time, (b) reducing zinc corrosion and solubility in the electrolyte and/or (c) employing an optimized buffering range (e.g., borate/phosphate ratio) in the electrolyte.

Maintaining Free Hydroxide Level/Reducing Carbon Dioxide

As discussed above, maintaining the free hydroxide level within particular concentration bounds provides a high conductivity (low impedance) electrolyte over the life of a nickel-zinc battery cell. Further, the free hydroxide level indirectly provides for long cycle life and the ability to discharge at high rates. It has been observed that in some instances decreasing cell performance correlates with decreasing hydroxide concentration.

One potential cause for drop-off in free hydroxide is the oxidation of organic compounds to produce carbon dioxide. The carbon dioxide is believed to react with hydroxide to form carbonate and thereby reduce the concentration of free hydroxide in the electrolyte. The oxidation of certain organic materials, such as those used in wet processing of the electrodes, is believed to be a source of carbon dioxide that contributes to the reduction of hydroxide concentration. Thus, in certain embodiments, steps are taken to minimize the amount of carbon dioxide and/or oxidizable organic compounds in the cell.

It is believed that the presence of organic compounds (particularly cellulosic compounds such as carboxymethlycellulose (CMC) and hydroxyethyl cellulose (HEC)) used during wet processing of the electrodes can serve as a source of carbon dioxide. Modified electrode processing operations that reduce or eliminate these compounds (and/or other oxidizable organics) can be important an important advance of this invention.

In some embodiments, the presence of carbon dioxide is reduced by limiting the amount of oxidizable organic compounds in the electrodes. This may be accomplished limited by, e.g., dry processing of one or more of the electrodes and/or replacing easily oxidizable organic compounds with other materials. In certain embodiments, the electrodes provided to an assembled cell contain no more than about 0.5% by weight of readily oxidizable organic materials.

Dry processing of the nickel electrode is described in U.S. Provisional Patent Application No. 60/657,825, filed Mar. 1, 2005, titled "Method of Manufacturing Nickel Zinc Batteries," which is hereby incorporated by reference. Dry fabrication processes need not employ CMC or other flow control agents, and also need not employ certain other organics commonly used in wet fabrication processes. Dry processing of the zinc electrode is also discussed in U.S. Patent Application No. 60/657,825. In certain embodiments, organic sources of carbon dioxide in the cell electrodes are eliminated or greatly reduced by employing dry processing at least the nickel electrode.

In some embodiments the zinc electrode or at least the zinc oxide used to manufacture the zinc electrode may be heated prior to electrode manufacture. This "burn-out" procedure, also described in U.S. patent application Ser. No. 10/921,062, may drive out dispersion agents and other organic materials, and carbonate from electrode materials. This effectively eliminates or at least reduces a potentially problematic source of carbon dioxide. Baking procedures vary according to the composition and quantity of electrode materials to be treated. In accordance with certain embodiments of the invention, a fabricated electrode or an electrode component is baked at temperatures ranging from about 150° C.-320° C. for a period of between about 0.5 and 2 hours.

In some embodiments, the negative impact of carbon dioxide and oxidizable organic materials is reduced by replacing easily oxidizable organic materials used in processing with materials that are not as susceptible to oxidation. Specifically, in some embodiments, compounds such as polyacrylic acids, polyacrylates, polyolefins (including fluorinated polyolefins such as PTFE), and the like are used in place of cellulosic compounds as binding agents, dispersants, flow agents, etc. during wet processing of one or more of the electrodes.

The problem of hydroxide depletion is exacerbated in cells operating at "starved conditions" (i.e., a relatively low total amount of electrolyte in the cell). As discussed in U.S. patent application Ser. No. 11/116,113, filed Apr. 26, 2005, titled "Nickel Zinc Battery Design," hereby incorporated by reference, it is desirable to operate a cell at starved conditions for a variety of reasons. A starved cell is generally understood to be one in which the total void volume within the cell electrode stack is not fully occupied by electrolyte. In contrast, a "flooded" cell has all void volume occupied by electrolyte and excess unentrained electrolyte within the cell container. In a typical example, the void volume of a starved cell after electrolyte fill may be less than about 10% of the total void volume before fill.

In some embodiments, it may be desirable that the electrolyte contains little if any carbonate in the cell. In addition to being a product of the reaction of hydroxide and carbon dioxide in the cell, carbonate in the electrolyte may serve to reduce the ionic transport capability of the electrolyte. As discussed above, carbonate may enter the electrolyte through the oxidation of organic materials or may be present in materials used in electrode manufacturing. Many commercial sources of zinc oxide have significant carbonate content. In certain embodiments, the zinc oxide used to manufacture negative electrodes contains not greater than about 1 percent by weight of carbonate. Further, in certain embodiments, the electrolyte, as provided before filling the cell, contains no more than about 1% carbonate.

In certain embodiments, it is assumed and accepted that some amount of hydroxide will be removed over the course of a nickel-zinc battery cell's life. In accordance with these embodiments, the initial amount of hydroxide in the cell is boosted to account for electrolyte that will be taken out of solution during normal operation. Thus, if there is a preferred operating window for hydroxide concentration in the electrolyte, the initial concentration of hydroxide is set at or slightly above the high concentration end of that window. In such embodiments, the concentration of hydroxide initially present in the electrolyte may be at least about 7M. In experiments to determine typical carbonate levels existing during the cycling of the cells it has been found that after the initial charge as much as 0.39M may be present. This may increase to 0.7M and above as the cell has cycled more than 150 times.

Figure 7:
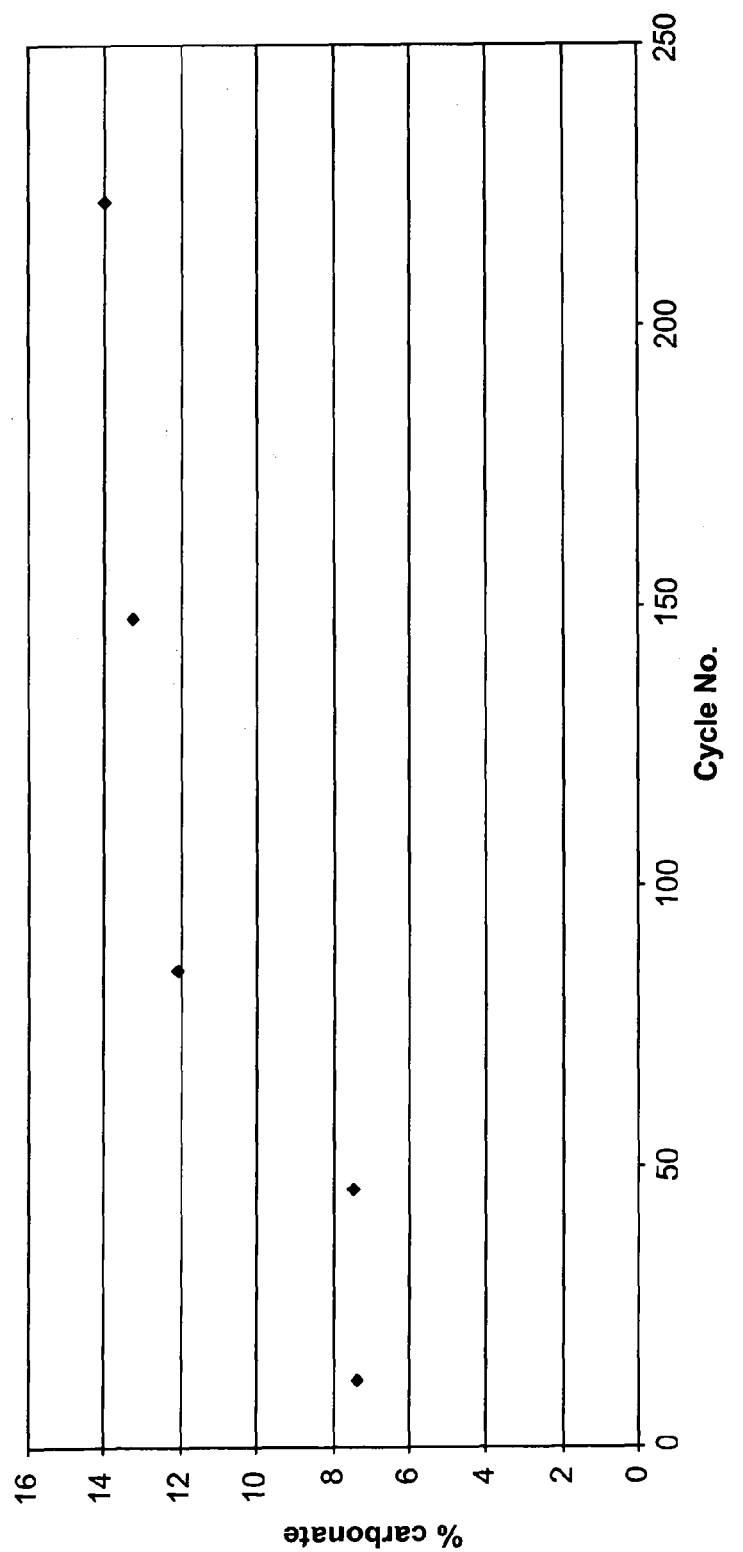
FIG. 7 is a graph of carbonate concentration in an alkaline electrolyte of this invention over the course of multiple cycles in a sub-C cell.

FIG. 7 shows how carbonate increased in concentration in a sub-C cell employing 8.6M hydroxide and 1.5M borate in the electrolyte and cycled at approximately 20° C. As shown, the concentration of carbonate increased from slightly over 7% of the total alkalinity immediately after formation to approximately 14% of total alkalinity after about 200 cycles.

Reducing Zinc Corrosion and Solubility in the Electrolyte

During discharge, zinc is oxidized from metallic zinc to zinc (II) and dissolves in the electrolyte in the form of zincate anions (e.g. $Zn(OH)_4^{2-}$). Shape change and dendrite formation that occur when the dissolved zinc does not replate uniformly on the electrode significantly affects cycle life.

In some embodiments, the electrolyte may contain one or more of the following additives to reduce solubility of zinc in the electrolyte: formaldehyde-sulfoxyate, oxalate, oleate, phosphate, silicate, stearate, sulfide and carbonate anions.

In addition to leading to shape change and dendrites, zinc corrosion evolves hydrogen. It has been found that the addition of indium to the electrolyte inhibits zinc corrosion and thus provides improved cycle life over the electrolytes described in the Eisenberg patent. In preferred embodiments, the electrolyte contains indium in a concentration range of between about 0.0003 and 0.01 moles per liter of total solution.

Buffering

In addition to maintaining hydroxide levels and reducing zinc solubility and corrosion, the electrolyte formulations may provide improved cycle life and capacity by tuning the ratio of borate to phosphate in the electrolyte.

The borates, arsenates, and/or phosphates in the electrolyte are trivalent anions that act as buffers. It is believed that the buffering effect beneficially affects the positive electrode (which prefers a highly alkaline environment) and the negative electrode (which prefers a less-alkaline environment). While the Eisenberg patent, referred to above, describes using a borate, phosphate, or arsenate salt alone or in combination in the electrolyte, it has been found that certain concentrations or ratios of borate and phosphate provide particularly good performance. Examples of electrolytes with various amounts of phosphate and/or borate are described elsewhere herein.

Process

The electrolytes of the invention are typically prepared by adding the phosphate and the other components of the electrolyte to a hydroxide solution in the desired amounts. The solution may then be heated, e.g. to 50-60° C., to aid in dissolution of the components. Heat may shorten preparation time, especially if components with low solubilities, such as indium, are added. As indicated elsewhere herein, indium may be introduced by alternative methods such as anodic dissolution.

A specific example of a method that may be employed to produce an electrolyte of this invention follows here.

A. Formula

A standard formula for 2.63 liters of a high alkalinity phosphate buffered electrolyte is as follows:

| | | |
|---|---|---|
| Deionized water, reagent grade | 967 grams | 33.05% |
| Potassium Hydroxide sol. (45% KOH) | 2196 grams | 59.01% |
| Sodium Hydroxide (NaOH) | 88.5 grams | 2.38% |
| Lithium Hydroxide (LiOH) | 25.2 grams | 0.677% |
| Potassium Fluoride (KF) | 45.3 grams | 1.22% |
| Zinc Oxide (ZnO) | 4.8 grams | 0.129% |
| Sodium Phosphate ($Na_3PO_4 \cdot 12H_2O$) | 127.05 grams | 3.41% |
| | | (0.1M $PO_4^{-3}$) |
| Indium Sulfate $In_2(SO_4)_3$ | 4.29 grams | 0.115% |
| | | (500 ppm In) |

B. Mixing Procedure
1. Weigh all components according to batch size set aside for addition in later steps.
2. Add the KOH solution to the 1 gallon plastic container.
3. Heat the deionized water to 75-85° C.
4. Add the water to the container.
5. Place on a stirring plate and start mixing with a stirring bar.
6. As the solution is stirring, pour the solids in one compound at a time.
   a. Add Sodium Hydroxide and Lithim Hydroxide and let dissolve (clear solution)
   b. Add Sodium Phosphate and allow to dissolve (clear solution)
   c. Add remaining compounds (KF, ZnO, Indium)
7. Screw the lid on the container to protect from the air and mix with magnetic stirring until all compounds dissolve or for a minimum of 5 hours.
8. Filter electrolyte to remove any solid particles that may have precipitated or failed to dissolve during mixing.
   a. Setup a vacuum assisted Buchner funnel.
   b. Setup the vacuum pump and filter assembly.
   c. Turn the vacuum pump ON.
   d. Pour the electrolyte solution into the funnel.
   e. When the entire electrolyte is filtered, collect the filtered solution and store the electrolyte in a properly labeled container.
   f. In a clean new plastic bottle (150-250 ml size), collect a 30 ml sample of electrolyte
   g. Turn the vacuum pump OFF.

Cell Structures

Figure 8B:
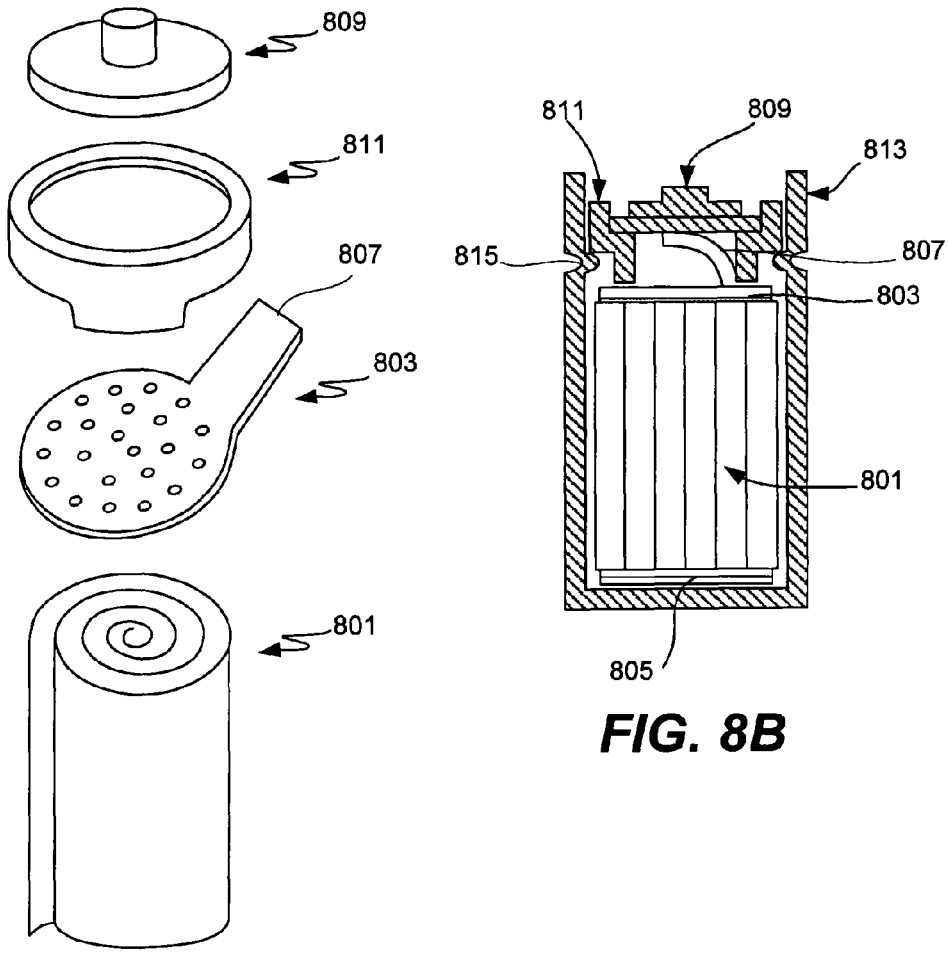
Figure 8A:
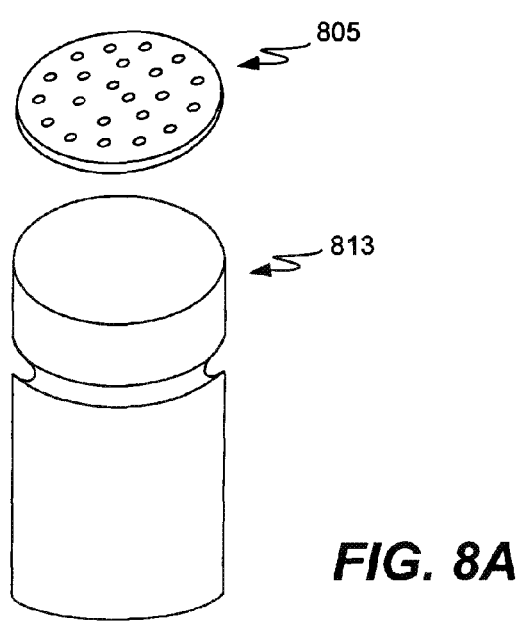
FIG. 8a shows an exploded view of a battery cell according to one embodiment of the present invention.

FIGS. 8A and 8B are graphical representations of the main components of a cylindrical power cell according to one embodiment of the present invention, with FIG. 8A showing an exploded view of the cell. Electrode and electrolyte layers are in cylindrical assembly 801 (also called a "jellyroll"). Negative collector disk 803 and positive collector disk 805 are attached to opposite ends of cylindrical assembly 801. The negative and positive collector disks function as internal terminals, with the negative collector disk electrically connected to the negative electrode and the positive collector disk electrically connected to the positive electrode. Cap 809 and can 813 are external terminals. Negative collector disk 803 includes tab 807 to connect the negative collector disk 803 to cap 809. Positive collector disk 805 is electrically connected to cap 813. The negative and positive collector disks 803 and 805 are shown with perforations, which may be employed to facilitate bonding to the jellyroll and/or passage of electrolyte from one portion of a cell to another. In other embodiments, the disks may employ slots (radial or peripheral), grooves, or other structures to facilitate bonding and/or electrolyte distribution. The embodiment shown in FIGS. 8A and 8B has a polarity reverse of that in a conventional NiCd cell, in that the cap is negative and the can positive. Gasket 811 rests on bead 815 and electrically insulates cap 809 from can 813.

The invention may be practiced in a wide range of nickel-zinc cell sizes and formats. For example, in addition to the cylindrical cell design shown in FIGS. 8A and 8B, electrolytes of this invention may be employed in relatively small prismatic cell formats, as well as various larger format cells employed for various non-portable applications.

CONCLUSION

The foregoing describes the instant invention and its presently preferred embodiments. Numerous modifications and variations in the practice of this invention will occur to those skilled in the art. Such modifications and variations are encompassed within the following claims. The entire disclosures of all references cited herein are incorporated by reference for all purposes.

What is claimed is:

1. A rechargeable nickel-zinc battery cell comprising:
   a negative electrode comprising zinc or a zinc compound;
   a positive electrode comprising nickel oxide, hydroxide, and/or oxyhydroxide; and
   an electrolyte comprising:
      between about 0.025 and 0.25 M phosphate;
      between about 4 and 9 M free alkalinity, and
      between about 0 and 0.5 M borate.

2. The battery cell of claim 1, wherein the phosphate is present in the electrolyte in a concentration of between about 0.05 and 0.15M.

3. The battery cell of claim 1, wherein the free alkalinity is present in the electrolyte in a concentration of between about 4M and 6M.

4. The battery cell of claim 1, wherein the free alkalinity is present in the electrolyte in a concentration of between about 6M and 9M.

5. The battery cell of claim 4, wherein the free alkalinity is provided as hydroxides of sodium, lithium, and potassium.

6. The battery cell of claim 5, wherein electrolyte comprises lithium hydroxide at about 0-4M, sodium hydroxide at about 1.5 to 3.5M, and potassium hydroxide at about 4-7M.

7. The battery cell of claim 1, wherein the electrolyte further comprises an indium compound.

8. The battery cell of claim 7, wherein the indium compound is indium sulfate, indium acetate, or indium fluoride.

9. The battery cell of claim 7, wherein the indium compound is present in the electrolyte in a concentration of between about 0.0003 and 0.01M.

10. The battery cell of claim 1, wherein the electrolyte further comprises a compound selected from the group consisting of a polyethylene glycol, tetrabutylammonium hydroxide, and an alkyl phosphate ester.

11. The battery cell of claim 1, wherein the positive electrode comprises no organic compound other than one or both of a fluorinated polyolefin and a dispersion agent.

12. The battery cell of claim 1, wherein the rechargeable nickel-zinc battery cell is a starved format cell.

13. The battery cell of claim 1, wherein the recited electrolyte composition exists prior to formation of the rechargeable nickel-zinc cell.

14. The battery cell of claim 1, wherein the electrolyte further comprises between about 0.01 and 1 M fluoride.

15. A rechargeable nickel-zinc battery cell comprising:
    a negative electrode comprising zinc or a zinc compound;
    a positive electrode comprising nickel oxide, hydroxide, and/or oxyhydroxide; and
    an electrolyte comprising:
       between about 0.025 and 0.25M phosphate,
       between about 6 and 9 M free alkalinity, and
       between about 0 and 0.5 M borate;
    wherein the rechargeable nickel-zinc battery cell has a starved format.

16. The battery cell of claim 15, wherein the free alkalinity is provided, at least in part, with lithium hydroxide.

\* \* \* \* \*

UNITED STATES PATENT AND TRADEMARK OFFICE
CERTIFICATE OF CORRECTION

PATENT NO. : 7,816,030 B2  
APPLICATION NO. : 12/476166  
DATED : October 19, 2010  
INVENTOR(S) : Jeffrey Phillips et al.

Page 1 of 1

It is certified that error appears in the above-identified patent and that said Letters Patent is hereby corrected as shown below:

On the Title Page

1. In the Related U.S. Application Data Item (63), line 8, change "2001, said" to --2001; said--.

2. In the Related U.S. Application Data Item (63), line 8, after "No. 11/346,861" add --is also a continuation in-part of--.

3. In the Related U.S. Application Data Item (63), line 10, after "abandoned," add --which--.

4. In the Related U.S. Application Data Item (63), line 13, change "2001, said" to --2001; said--.

5. In the Related U.S. Application Data Item (63), line 14, after "No. 11/346,861" add --is also a continuation in-part of--.

6. In the Related U.S. Application Data Item (63), line 15, after "abandoned," add --which--.

Signed and Sealed this  
Twenty-fifth Day of January, 2011

David J. Kappos  
*Director of the United States Patent and Trademark Office*